April 21, 1931.  F. J. BAST  1,801,300
AUTOMATIC GAS VALVE
Filed Aug. 10, 1929  2 Sheets-Sheet 1
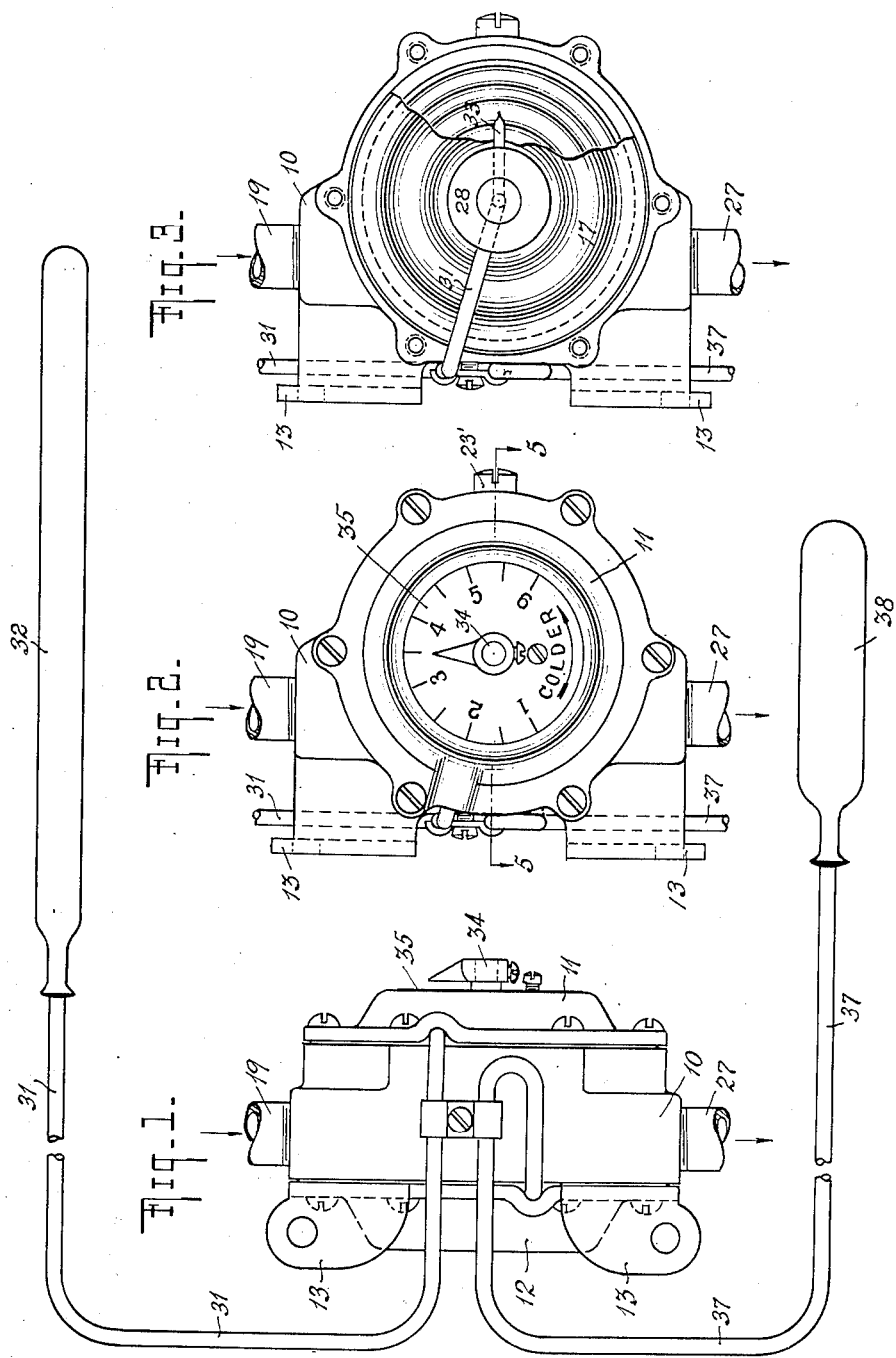
WITNESS
INVENTOR
FRANK J. BAST
BY
ATTORNEYS

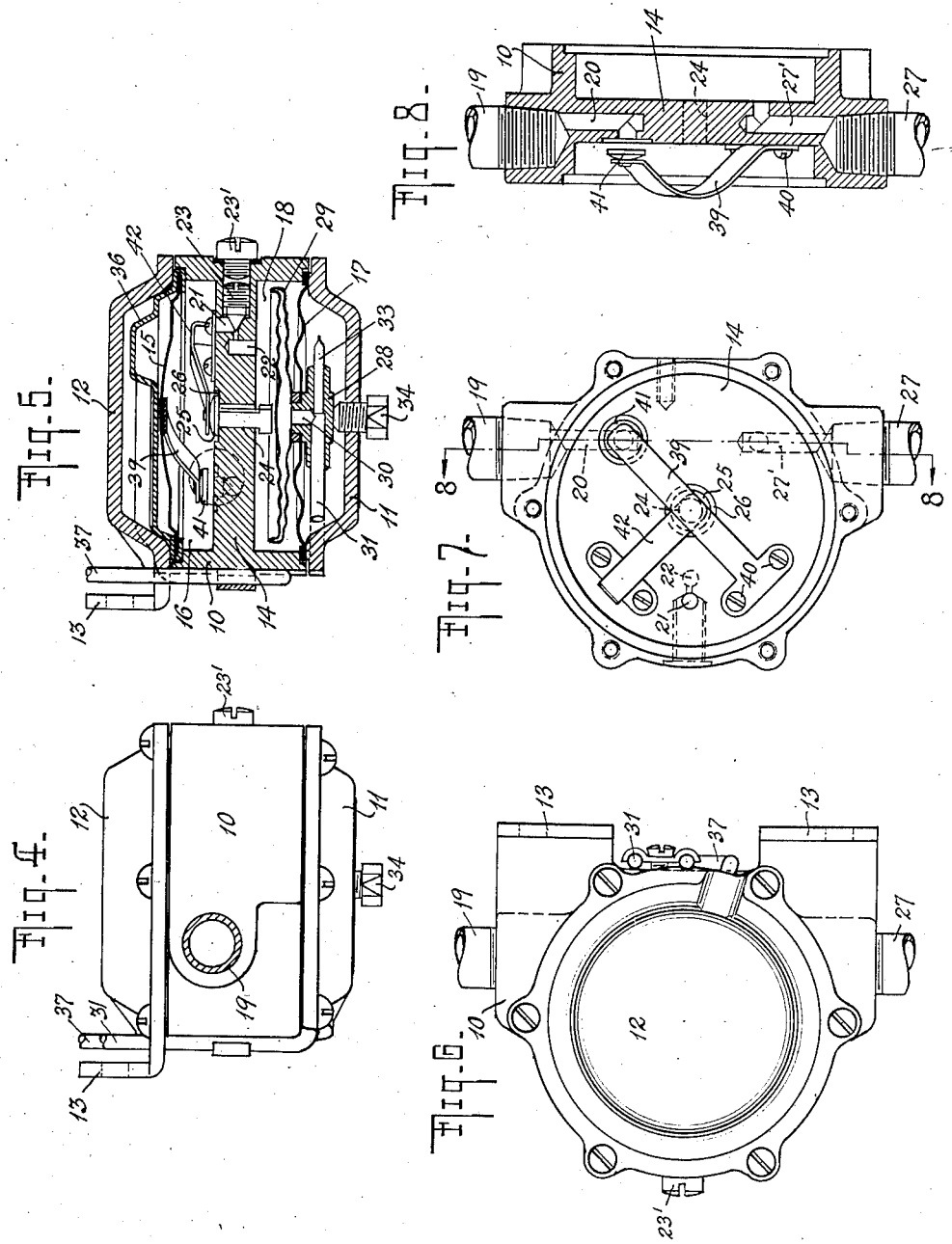

Patented Apr. 21, 1931

1,801,300

UNITED STATES PATENT OFFICE

FRANK J. BAST, OF QUEENS VILLAGE, NEW YORK, ASSIGNOR TO CHARLES J. TAGLIABUE MFG. CO., OF BROOKLYN, NEW YORK, A CORPORATION OF NEW YORK

AUTOMATIC GAS VALVE

Application filed August 10, 1929. Serial No. 385,029.

REISSUED

My invention relates to automatic control valves, and more particularly to the type of valves employed to control the feed of gas to an automatic gas-heated refrigerator.

In refrigerators of this type, a soluble gas is caused to dissolve in water, the solution being then heated in a boiler section of the apparatus and the gas driven off under pressure and liquefied by cooling with running water. The liquefied gas is then permitted to vaporize and expand in a set of cooling coils located in the refrigerating compartment of the refrigerator, after which it is re-absorbed by the water and the cycle thus repeated continuously. The degree of cooling is regulated and a predetermined temperature maintained in the refrigerating compartment by controlling the rate at which the soluble gas is driven off from its water solution, i. e. by regulating the size of the gas flame. Refrigerators of this type are generally so operated that the heater portion or boiler thereof is constantly heated by a pilot flame, such flame being increased by a thermostatic control device when the temperature in the refrigerator rises above a predetermined maximum. In view of the fact that the soluble cooling gas is driven off at high pressure in such heater or boiler section of the refrigerator, the danger exists that the pressure therein will rise above a safe maximum and that the continued feeding of the burner with gas might result in an explosion.

It is an object of the present invention to provide a combined automatic valve capable of regulating the size of the flame in order to maintain a predetermined temperature in the refrigerator, and also of cutting off completely the supply of gas to the burner mechanism when the temperature or pressure in the water boiler rises above a safe maximum.

It is also an object of the present invention to provide a valve of the type indicated which is extremely compact and simple in construction and accurate and reliable in operation.

It is a further object of the invention to provide simple adjusting means for a valve of this type whereby the temperature automatically maintained in the refrigerating compartment may be predetermined at will.

In the accompanying drawing is shown by way of example a preferred embodiment of the invention; in said drawing, Fig. 1 is a side elevation of my combined valve structure; Fig. 2 is a front elevation thereof; Fig. 3 is a view similar to Fig. 2 but with the cover plate removed to show the interior structure; Fig. 4 is a plan view of Fig. 2; Fig. 5 is a section taken along the line 5—5 of Fig. 2; Fig. 6 is a rear view of the device; Fig. 7 is a view similar to Fig. 6 but with the bottom plate removed; and Fig. 8 is a section along the line 8—8 of Fig. 7.

Fig. 1 shows a valve casing composed of a body section 10, a top cover plate 11 and a bottom plate 12, the latter being provided with lugs 13 by means of which the valve may be attached to a wall or other supporting surface. The body section 10 is preferably of annular cross-section and is provided with a plate or partition 14 which may be integral therewith. A snapping diaphragm 15, which is clamped in gas-tight manner to the body 10 by the plate 12, forms with the partition 14 a gas-tight chamber 16; while a pliable or flexible wall or partition 17, which is similarly clamped to the casing 10 by the plate 11, forms with such partition a second gas-tight chamber 18. The chamber 16 is supplied with fuel gas by means of a conduit 19, the gas passing from such conduit into the chamber through a channel 20 in the plate 14 as shown in Fig. 8. The gas from chamber 16 passes into chamber 18 through ports 21 and 22 in the partition 14, such ports being controlled by an adjustable screw 23 in the form of a needle valve; a screw 23', and if desired, also a pliable washer, may be employed to make gas-proof the threaded hole in which screw 23 is located. The gas may also enter chamber 18 through a central bore 24 which is controlled by a valve 25. The stem of this valve is of triangular cross-section so that when the valve is raised from its seat 26 the gas in chamber 16 flows through the channels bounded by the walls of bore 24 and the valve stem into chamber 18. The gas is withdrawn from the latter chamber through a bore 27' in the partition 14 to which is connected a conduit 27 leading to the burner which heats the boiler of the refrigerator absorption apparatus. The adjustable screw 23 serves to fix the size of the pilot flame which determines the minimum cooling effect produced by the refrigerator.

As stated above, the top plate 11 serves to clamp the pliable wall or diaphragm 17 against the body 10 of the casing, packing being provided at the circumference of the diaphragm in order to prevent leakage of gas from the chamber 18 into the space outside the diaphragm 17. The diaphragm is clamped at approximately the center thereof to a block 28 which is connected to and supports a temperature responsive element in the form of a flexible walled casing 29 whose interior is in communication with a bore 30 in such block and with a pipe 31 leading into such bore. The pipe is connected to a thermostatic bulb 32 containing an expansible fluid and located in the cooling chamber of the refrigerator. The bulb may be filled through a pipe 33 fitted into the block 28 and communicating with the pipe 31, after which the end of pipe 33 may be pinched and soldered to make the same gasproof. The block 28 is engaged by an adjustable screw 34 which may be provided with a pointer cooperating with a scale 35 for a purpose to be explained hereinafter.

The bottom plate 12 encloses dished plate 26 whose edge may be bent around the edge of the snapping diaphragm 15 and clamped with the latter to the valve casing 10, thus forming a closed casing acting as a thermostatic element which is connected by means of a pipe 37 to a thermostatic bulb 38 adapted to be located within the boiler of the absorption apparatus. A spring arm 39 is mounted upon the partition 14 as shown at 40, said arm being curved and passing adjacent the central portion of the snapping diaphragm 15. The free end of the arm 39 carries a cap 41 which directly overlies the gas inlet channel 20.

The valve 25 is located above the central portion of the casing 29 and is urged toward its closed position by a spring arm 42. Upon expansion of the casing 29 due to increase of pressure therein, the upper wall thereof rises and lifts the valve 25 against the resistance of arm 42.

The operation of my combined valve is as follows: The inlet channel 20 is normally open and the fuel gas passes therethrough from pipe 19 into the chamber 16. A fixed quantity of gas as predetermined by the setting of the adjustable screw 23 passes continuously through the ports 21 and 22 into the chamber 18 from which it is conducted by the pipe 27 to the burner of the absorption apparatus. As the temperature in the refrigerating compartment rises, the pressure in the bulb 32, increases. The casing 29 thereupon expands and raises the valve 25 off its seat, thereby permitting an additional quantity of gas to pass into the chamber 18 through the bore 24. The burner flame is thus increased, more of the soluble refrigerating gas is driven off from its water solution per unit of time and the cooling compartment cooled to a greater extent. This causes a drop in the temperature of such compartment whereupon casing 29 contracts and permits valve 25 to close completely or partially. During the normal operation of the device the valve 25 remains open only to such an extent as is sufficient to produce in the cooling compartment a predetermined temperature. This temperature is controlled by means of the screw 34 which raises or lowers the block 28 and thereby brings the casing 29 nearer to or moves it farther from the valve 25, thus making necessary lesser or greater expansion of casing 29 before the valve is operated.

When the pressure, and consequently also the temperature, of the vapors in the boiler of the absorption apparatus rise above a predetermined maximum, the fluid in the thermostatic bulb 38 expands and causes the diaphragm 15 to move downwardly as seen in Fig. 5 until it reaches a position approximately near the horizontal plane whereupon it quickly snaps beyond such plane and strikes the spring arm 39 forcing the same to seat the valve cap 41 over the channel 20; thereupon the feed of gas into the chamber 16 and hence to the gas burner is stopped. It will be understood that the burner is itself provided with a thermostatically controlled valve of any known type which closes when the flame goes out, so that when gas is again fed to the burner such gas will not be able to reach the burner jet until after the burner has been manually heated to open such valve.

It will be obvious that my automatic valve mechanism may be employed in other relations than as above described to control the feed of various gases or fluids in response to changes in the temperature or pressure or both at one or more points. By replacing the thermostatic bulb with a pressure responsive mechanism, or by connecting the casings 29 or 36, or both, directly with a vessel or vessels under pressure, my improved valve can be made to control the flow of a fluid in response to the pressure conditions at selected points.

Variations may be resorted to within the scope of the appended claims without departing from the spirit of the invention.

I claim:

1. An automatic valve mechanism suitable for use in controlling the feed of a combustible fluid to the burner of a heating apparatus to maintain predetermined temperature or pressure conditions at a selected point and to prevent rise of temperature or pressure at a selected point beyond a safe maximum, and comprising, in combination, a casing, means in said casing forming two gas-tight chambers therein and including a transverse partition having a bore connecting the chambers, a valve controlling said bore, an element provided with a connection whereby it may be attached to a temperature or pressure responsive device and operatively associated with said valve to adjust the same in response to variations in the temperature or pressure at a selected point, said partition having a channel opening into one of said chambers and adapted to be connected to a conduit to be charged with a fluid fuel thereby, the second chamber being adapted to be connected to a conduit for withdrawing the fluid charged thereinto by said valve, a normally open second valve arranged to control said channel, and a second element provided with a connection whereby it may be attached to a temperature or pressure responsive device and operative to close said second valve completely upon rise of the temperature or pressure at a selected point beyond a safe maximum.

2. The combination as set forth in claim 1, wherein the second-mentioned valve is located within the first-mentioned chamber.

3. The combination as set forth in claim 1 including a resilient arm normally holding said second-mentioned valve in open position.

4. The combination as set forth in claim 1 including a resilient arm normally urging said first-mentioned valve into closed position.

5. The combination as set forth in claim 1, wherein said first-mentioned element comprises an expansible member located in said second chamber, a movable block supporting said member, and an adjustable screw engaging said block.

6. The combination as set forth in claim 1, wherein said second element comprises an expansible member located within said casing and having a resilient diaphragm forming a wall thereof, said diaphragm being operative upon rise of pressure in said member beyond a predetermined maximum to move quickly to close said second-mentioned valve.

7. The combination as set forth in claim 1, wherein said partition is provided with an additional passageway connecting the chambers, and an adjustable pilot valve controlling said passageway.

8. An automatic valve mechanism suitable for use in controlling the feed of a combustible fluid to the burner of a heating apparatus to maintain predetermined temperature or pressure conditions at a selected point and to prevent rise of temperature or pressure at a selected point beyond a safe maximum, and comprising, in combination, a casing, means in said casing forming two gas-tight chambers therein and including a transverse partition having a bore connecting the chambers, a channel in said partition opening into one of said chambers and adapted to be connected to a conduit for charging a fluid fuel into such chamber, such fuel passing through said bore into the second chamber, a second channel in said partition opening into the latter chamber and adapted to be connected to a second conduit for withdrawing the fuel to a place of use, a valve controlling said bore, an element provided with a connection whereby it may be attached to a temperature or pressure responsive device and operatively associated with said valve to adjust the same in response to variations in the temperature or pressure at a selected point, said partition, being provided with a second passageway connecting said chambers, a pilot valve controlling said passageway, a normally open valve controlling said first-mentioned channel, and a second element provided with a connection whereby it may be attached to a temperature or pressure responsive device and operative to close said last-mentioned valve upon rise of the temperature or pressure at a selected point beyond a safe maximum.

9. An automatic valve mechanism suitable for use in controlling the feed of a combustible fluid to the burner of a heating apparatus to maintain predetermined temperature or pressure conditions at a selected point and to prevent rise of temperature or pressure at a selected point beyond a safe maximum, and comprising, in combination, a casing, means in said casing forming two gas-tight chambers therein and including a transverse partition having a bore connecting the chambers, a channel in said partition opening into one of said chambers and adapted to be connected to a conduit for charging a fluid fuel into such chamber, such fuel passing through said bore into the second chamber, a second channel in said partition opening into the latter chamber and adapted to be connected to a second conduit for withdrawing the fuel to a place of use, a valve controlling said bore, a resilient arm normally urging said valve into closed position, an element provided with a connection whereby it may be attached to a temperature or pressure responsive device and operatively associated with said valve to adjust the same in response to variations in the temperature or pressure at a selected point, said partition being provided with a second passageway connecting said chambers, a pilot valve controlling said passageway, a normally open valve controlling said first-mentioned channel, a resilient arm supporting said last-mentioned valve, and a second element provided with a connection whereby it may be attached to a temperature or pressure responsive device and operative to close such valve upon rise of the temperature or pressure at a selected point beyond a safe maximum.

FRANK J. BAST.